United States Patent [19]
Church et al.

[11] Patent Number: 6,027,397
[45] Date of Patent: Feb. 22, 2000

[54] DUAL ELEMENT LAPPING GUIDE SYSTEM

[75] Inventors: Mark A. Church, Los Gatos; Alain Michael Desouches, Santa Cruz, both of Calif.

[73] Assignee: International Business Machines Corporation, Armonk, N.Y.

[21] Appl. No.: 08/845,678

[22] Filed: Apr. 25, 1997

[51] Int. Cl.[7] .............................. B24B 49/02; G11B 5/127
[52] U.S. Cl. .................... 451/1; 451/5; 451/8; 29/603.13; 29/603.1
[58] Field of Search ........................... 29/603.01, 603.09, 29/603.13; 324/252; 360/113, 122; 451/1, 5, 8

[56] References Cited

U.S. PATENT DOCUMENTS

| | | |
|---|---|---|
| 4,559,743 | 12/1985 | Kracke et al. . |
| 4,675,986 | 6/1987 | Yen . |
| 4,689,877 | 9/1987 | Church . |
| 4,839,197 | 6/1989 | Henderson . |
| 4,841,625 | 6/1989 | Valstyn . |
| 4,912,883 | 4/1990 | Chang et al. . |
| 4,914,868 | 4/1990 | Church et al. . |
| 4,991,046 | 2/1991 | Adamson et al. . |
| 5,175,938 | 1/1993 | Smith . |
| 5,210,667 | 5/1993 | Zammit . |
| 5,361,547 | 11/1994 | Church et al. . |
| 5,494,473 | 2/1996 | Dupuis et al. . |
| 5,816,890 | 10/1998 | Hao et al. ..................................... 451/5 |
| 5,876,264 | 3/1999 | Church et al. ............................... 451/5 |

FOREIGN PATENT DOCUMENTS 5-101339  4/1993  Japan .

OTHER PUBLICATIONS

IBM Technical Disclosure Bulletin, "Using Magneto–Resistive Head Transducers as Lapping Transducers and a Parallel Resistor System to Calculate Lapping Constants", vol. 36, No. 09A, Sept. 1993, pp. 79–81.

IBM Technical Disclosure Bulletin, "Element Height Determination for Thin–Film Transducers", vol. 18, No. 11, Apr. 1976, pp. 3782–3783.

*Primary Examiner*—Timothy V. Eley
*Attorney, Agent, or Firm*—Robert B. Martin

[57] ABSTRACT

A dual element electrical lapping guide system is disclosed for a row of multi-layer dual element magnetoresistive and inductive magnetic transducers formed on a substrate, which will be used to form sliders, the sliders being separated by separation kerfs, and the multi-layer transducers aligned along an edge of the substrate for lapping of the edge. The dual element lapping guide system comprises superposed resistive elements and electrical switch elements, each positioned in one of the separation kerfs, and having an edge thereof positioned so as to be aligned with the edge of the row and subject to lapping of the row. Each electrical switch element comprises a bottom and a top layer connected at one end thereof and separated at the other end thereof by an insulation layer, so as to be initially closed at the connected end, which end is aligned with the edge of the multi-layer transducers and subject to lapping of the row at the connected end to open the switch element.

8 Claims, 7 Drawing Sheets

DUAL ELEMENT LAPPING GUIDE SYSTEM

DOCUMENT INCORPORATED BY REFERENCE

Commonly assigned U.S. Pat. No. 4,914,868 is incorporated for its showing of a lapping control system for a row of thin film magnetic transducers formed on a substrate.

Commonly assigned U.S. Pat. No. 5,361,547 is incorporated for its showing of offset electrical lapping guide switches and resistance elements for calibrating resistance versus throat height characteristics.

FIELD OF THE INVENTION

This invention relates to lapping guides, and, more specifically, to lapping guides for magnetic transducers positioned in a row on a substrate, wherein the transducers are separated by separation kerfs.

BACKGROUND OF THE INVENTION

Conventional thin film read/write heads in data storage systems generally include an inductive write head in combination with either an inductive or magneto resistive (MR) read head. One type of MR/inductive head includes an inductive write head formed adjacent to a magneto resistive read head. The requirements for higher data density on the magnetic disks have imposed a requirement to read and write more data on narrower tracks located on the disk. Thus, a magnetic head must be of greater precision to maximize its efficiency and sensitivity to read and write data.

Typically, the combined inductive write transducer and MR read transducer are formed from adjacent layers of material on a wafer substrate so as to read and write on the same track. The production of the heads comprises a sequence of deposition and etching steps with the MR transducer formed first, and the inductive write transducer formed on top of the MR transducer. The MR transducer typically comprises a magnetoresistive stripe and two conductors on either side thereof. The stripe height is critical, and is determined by the height defining edge, which is the bottom edge of the stripe. The inductive transducer typically comprises a bottom pole, an insulating layer, half an electrical coil, an insulating layer, a top pole, an insulating layer, and the other half of the coil. The coil halves are interconnected by means of vias, and the coil and the two conductors of the MR transducer are connected to terminals by means of vias. The inductive transducer poles are narrowed to a very narrow pole tip having a precisely controlled width, or throat, the width of which defines the recorded track width. The height of the throat is also an important factor in the optimization of the inductive transducer.

In order to achieve maximum efficiency, both the inductive write transducer and the magnetoresistive read transducer should be designed to have optimum characteristics. A key characteristic for the inductive write transducer is the pole tip height dimension, commonly called throat height. The throat height must be maintained within a limited tolerance for generating an optimum magnetic signal from the input electrical signal. The key characteristic of the magnetoresistive read transducer is the stripe height which must be maintained within a limited tolerance so that the optimum change in resistance is generated in response to the sensed magnetic signal.

Typically, rows of transducers are deposited simultaneously on the wafer substrate using semiconductor type process methods. The wafer substrate may be a hard ceramic material which is used to form disk sliders or tape modules, with the heads deposited thereon. The substrate is then cut into rows of sliders or modules in a side-by-side relationship with the pole tips of the inductive write transducers and the MR stripes of the MR read transducers extending to an edge of the substrate row. The row edge is then lapped to the optimum dimensions of throat height and stripe height.

The accumulated stresses on the substrate and cutting alignment, together with the extremely small dimensions of the heads, may increase the chance that not all the transducers in the row will be precisely aligned with the lapping edge. This condition is defined in the incorporated '868 patent as "row bow". The '868 patent addresses row bow by measuring the resistance of the MR elements in the MR transducers and using the measured resistance to determine the MR transducer stripe height. A lapping control system may use a holder to deflect the substrate row to an appropriate shape to compensate for row bow. Thus, each of the MR transducers in a substrate row of transducers are lapped to the optimum magnetoresistive transducer stripe height based on the measured MR transducer resistances.

The '868 patent assumes that the inductive transducer pole tip throat height is less sensitive and will be within tolerance so long as the MR transducer is within tolerance. Modern higher areal recording densities, however, require the use of higher coercivity disks, which in turn require improved write head element designs and tighter control of the pole tip throat height. Modern electronics may utilize a non-optimum throat height by means of characterization of the throat height and modifying the supplied write signals. Thus, for characterization purposes, it would be of significant benefit to be able to determine throat height before the throat is lapped too far, and is effectively destroyed. Additionally, as the write function becomes more difficult, it will be necessary to bring the throat height to within tolerance while not sacrificing MR transducer performance. It would therefore be beneficial to be able to continue to lap the throat height to bring the throat within tolerance, so long as the MR stripe height is within tolerance, and vice versa.

Additionally, space on the wafer used to form the sliders is extremely important. Any space used for other purposes, such as lapping guides, cannot be used for sliders or nodules, reducing the wafer efficiency and increasing the cost of each slider or module.

The incorporated '547 patent illustrates two separate types of single electrical lapping guides (ELG) positioned in the kerfs between sliders in a substrate row. One type of ELG is a switch that is provided at two separate lengths. The second type of ELG is a resistive device, also provided at two separate lengths. The resistive devices may provide the fine lapping control for the pole tip throat height of inductive transducers and may be calibrated by the two switches as described in the '547 patent.

The '547 patent assumes that positioning the lapping guides across the row in separate kerfs provides adequate throat height lapping control. The '547 patent does not consider MR stripe height.

However, the distortion of a wafer row caused by row bow and the need for more accurate control of MR stripe height and pole tip throat height may require that the lapping guides be as close to the associated individual sliders or modules as possible.

Furthermore, it is desirable to predict both stripe height and throat height to control the lapping of either the inductive transducer or the MR transducer, or both, and the means provided should not occupy space that otherwise may be used for forming sliders or modules.

SUMMARY OF THE INVENTION

Disclosed is a dual element electrical lapping guide system for a row of multi-layer dual element magnetoresistive (MR) and inductive magnetic transducers formed on a wafer substrate, which will be used to form sliders or modules, the sliders or modules being separated by separation kerfs, and the multi-layer transducers aligned along a row edge of the substrate for lapping of the edge.

The dual element lapping guide system comprises superposed resistive elements and electrical switch elements. The resistive elements are each positioned in one of the separation kerfs, and each has an edge thereof positioned so as to be aligned with the edge of the row and subject to lapping of the row. The electrical switch elements are superposed on the resistive elements positioned in the separation kerfs, and each electrical switch element comprises a bottom and a top layer connected at one end thereof and separated at the other end thereof by an insulation layer, so as to be initially closed at the connected end, which end is aligned with the edge of the multi-layer transducers and subject to lapping of the row eat the connected end to open the switch element. A plurality of sets of electrical leads are provided, connecting the resistive element and the electrical switch element to electrical contact points, whereby the resistive element and electrical switch element may be measured to determine the extent of lapping thereof.

For one embodiment, the resistive element is made of the same material and simultaneously with the MR transducers and is therefore aligned therewith, and the electrical switch element is made of the same material and simultaneously with the poles of the inductive magnetic transducer and is therefore aligned therewith. The alignment of the resistive element with the MR transducer stripe provides an accurate indication of the stripe height as the resistance of the resistive element changes while lapped. The alignment of the inductive magnetic transducer with the electrical switch element provides an indication of the inductive magnetic transducer pole tip throat height at the time that the lapping opens the switch. That height indication is used together with the resistance of the MR material at the time the switch is opened to then calibrate the throat height so that subsequent lapping of the transducers and resultant increase in resistance of the resistive element indicates the precise pole tip throat height at the completion of lapping.

For a fuller understanding of the present invention, reference should be made to the following detailed description taken in conjunction with the accompanying drawings.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE INVENTION

Figure 1:
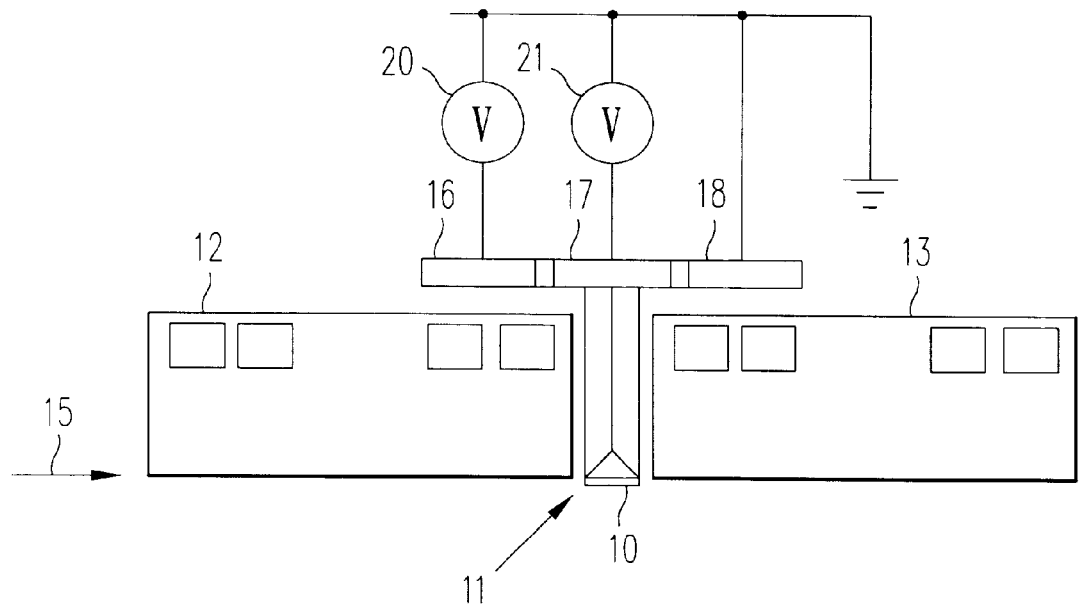
FIG. 1 is a diagrammatic representation of a dual element lapping guide of one embodiment of the present invention.

FIG. 1 illustrates a dual element lapping guide (ELG) 10 positioned in the separation kerf 11 between sliders 12 and 13 on a wafer substrate. As described above, the wafer substrate typically comprises many dozens of sliders and deposited heads arranged in rows. The substrate is then cut into rows of sliders in a side-by-side relationship with the pole tips of the inductive write transducers and the magnetoresistive (MR) stripes of the MR read transducers extending to an edge 15 of the substrate row. The row edge 15 is then lapped to the optimum dimensions of throat height and stripe height.

Typically, the combined inductive write transducer and MR read transducer are formed by adjacent layers of material on the substrate. The fabrication of the magnetic recording heads includes a sequence of deposition and etching steps with the MR transducer formed first, and the inductive write transducer formed on top of (superposed on) the MR transducer. The MR transducer typically includes a MR element having a critical stripe height which is determined by the height defining edge at the bottom edge of the MR element. The inductive transducer typically includes a bottom pole and a top pole, with the poles narrowed to a very narrow pole tip having a precisely controlled width, or throat, the width of which defines the recorded track width. The height of the throat may also be a critical factor in the optimization of the inductive transducer. Both the MR transducer stripe height and inductive transducer throat height are determined by the extent of lapping of edge 15.

The dual element lapping guide ELG 10 comprises a resistive element and a superposed electrical switch element, and each has an edge thereof positioned so as to be aligned with the edge 15 of the row and subject to lapping of the row. A set of electrical leads are provided for coupling the resistive element and the electrical switch element to electrical contact points 16, 17 and 18. The voltage detectors 20 and 21 are typically used to measure the resistive element and the electrical switch element in order to determine the extent of lapping.

Figure 2:
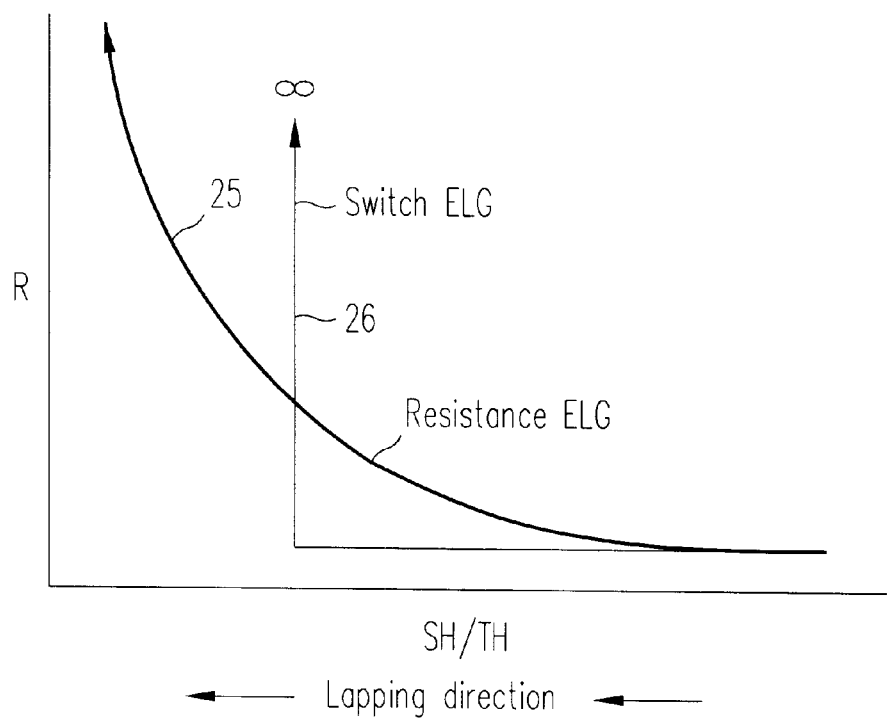
FIG. 2 is a graphical representation of the electrical response of the dual element lapping guide of FIG. 1.

FIG. 2 illustrates a graphical representation of the electrical response of the voltage detectors 20 and 21 of FIG. 1 with respect to the progress of lapping edge 15. As lapping is conducted, the resistance of the resistive element in the dual ELG 10 increases as shown by curve 25. As lapping is conducted, the switch goes from the closed condition with a resistance of zero to the open condition with a resistance of infinity, as shown by curve 26.

Figure 3:
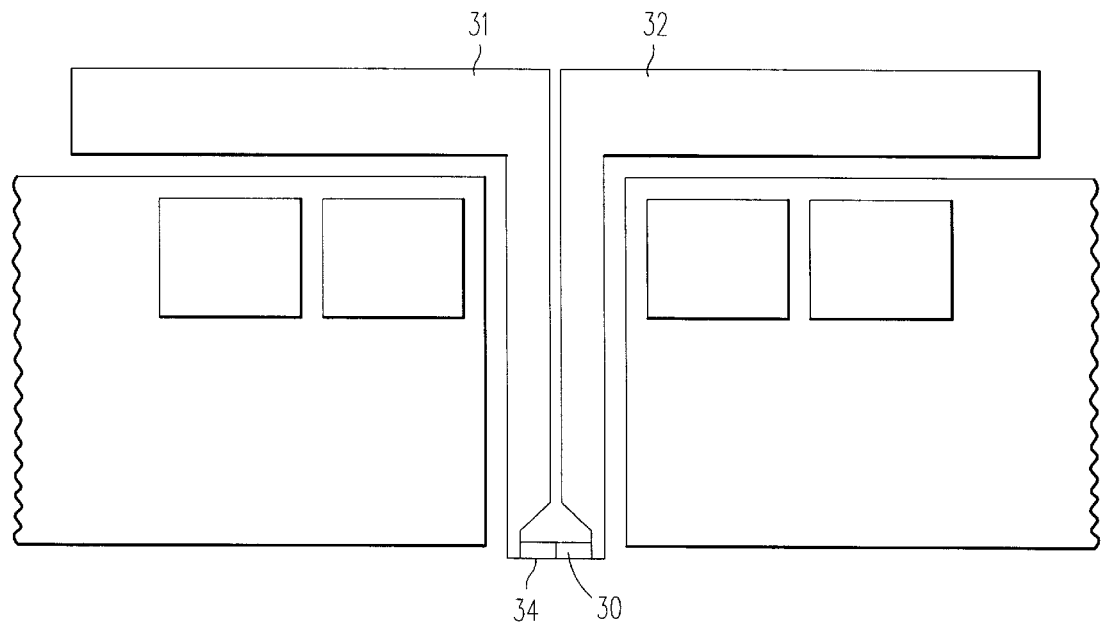
FIG. 3 is a diagrammatic representation of the resistive element of the dual element lapping guide of FIG. 1.

FIG. 3 illustrates a functional layout of the resistive element in the dual ELG 10 lapping guide. The resistive element includes a resistive stripe 30 having a height defining edge 34 aligned with the row edge 15 of FIG. 1. As height defining edge 34 is lapped, the height of the resistive stripe 30 decreases and the resistance of the stripe increases as is illustrated by curve 25 in FIG. 2. Electrical leads 31 and 32 connect the opposite sides of the resistive stripe 30 to terminals 16 and 18 in FIG. 1, respectively. Voltage detector 20 in FIG. 1 then detects the voltage of the resistive stripe in accordance with curve 25 in FIG. 2.

Figure 4:
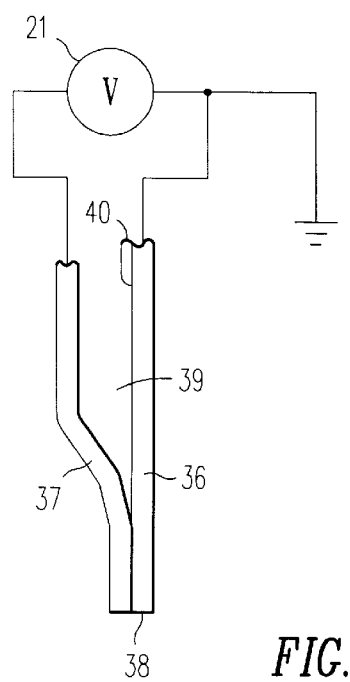
FIG. 4 is a diagrammatic representation of the electrical switch element of the dual element lapping guide of FIG. 1.

FIG. 4 illustrates a functional layout of the electrical switching element in the dual ELG 10 with a bottom conductive layer 36 and a top conductive layer 37 connected at edge 38 and separated by an insulator 39 at the other end. Edge 38 comprises the height defining edge and as the edge is lapped, the height of the electrical switching element is reduced to the point that the lapping reaches the insulator 39, at which point the connection between layers 36 and 37 is severed and the electrical switch opened. Electrical lead 40 connects the bottom conductive layer 36 to terminal 18 in FIG. 1, and top conductive layer 37 is connected to terminal 17. Voltage detector 21 in FIG. 1 detects the opening of the electrical switch as illustrated by curve 26 in FIG. 2.

Referring to FIGS. 3 and 4, preferably, the resistive element 30 is made of the same material and is deposited simultaneously with the MR transducers and is therefore aligned therewith, and the electrical switch element 36 and 37 is made of the same material and is deposited simultaneously with the poles of the inductive magnetic transducer and is therefore aligned therewith. The alignment of the resistive element 30 with the MR transducer stripe provides an accurate indication of the MR transducer stripe height as the resistance changes while lapping the resistive element 10. The alignment of the inductive magnetic transducer with the electrical switch element 36 and 37 provides an indication of the inductive magnetic transducer pole tip throat height at the time that the lapping opens the switch.

The electrical switch element 36 and 37 is superposed on the resistive element 30.

Referring to FIG. 2, the response curve 25 generated by the resistive element 30 as it is lapped can be predicted by previous calibration. Thus, the stripe height SH can be derived from the resistance R at any point along the resistance curve 25. The derived stripe height may be used together with the resistance of the resistive element 30 at the time the switch 36, 37 is opened, as indicated by the resistance of curve 25 when crossed by curve 26, to then calibrate the throat height so that subsequent lapping of the transducers and resultant increase in resistance of the resistive element 30 indicates the precise pole tip throat height at the completion of lapping.

The activation point of the electrical switch element 36, 37 is located at a specific distance below the desired throat height of the inductive transducer. It is designed into the throat height mask, which is also used to deposit the switch element, and is assumed to have the same required critical process control and collinearity.

Activation of the electrical switch element 36 and 37 triggers a control computer for the lapping process to save the resistive element height as calculated by the resistance R at the time of activation of the electrical switch element.

In a row of transducers and ELGs, one resistance height value corresponding to the switch activation is stored for each ELG site. Lapping continues until the average resistive element height, as calculated by a differential method, matches the MR transducer stripe height. At the end of such lapping, the final resistive element stripe height is determined at each ELG site. By quadratic curve fitting of the ELG stripe heights, the actual magnetoresistive transducer stripe height is interpolated at each slider site and extrapolated at the ends. The control computer may then calculate the inductive transducer pole tip throat height based on the set of resistive element final heights, the set of resistance element heights corresponding to the electrical switch element activations, and the offset between the electrical switch element activation point and the inductive transducer throat height. The calculation is given as:

$$TH_{elg} = SH_{elg} + SD - SH_{act}$$

where:

$TH_{elg}$=Throat height at the ELG site
$SH_{elg}$=Stripe height at the ELG site
SD=Switch distance to zero throat height
$SH_{act}$=ELG site stripe height at switch activation Once the throat height is determined at each ELG site, the throat height at each slider location can be interpolated between ELG sites and extrapolated at the ends by means of quadratic curve fitting through the line of ELGs.

Thus, the throat height for each inductive write transducer at each dual element head for each slider is known and may be adjusted to fit the current optimization for the write signal supplied to the head.

It is also an option to calculate both the MR stripe height and throat height of each head during lapping. The computer control may determine the decision on a final lapping target based on throat height or a combination of throat height and stripe height. Thus, the throat height may be lapped to its critical dimension so long as the MR stripe height is also within its critical range.

As an alternative to the single arrangement of switch height and ELG stripe height, the ELG's in alternating kerfs may have different heights. The use of different heights allows a more precise calibration at each of the resistive elements 30 by the controller in view of the different heights of the associated electrical switch elements 36, 37, as described in the incorporated '547 patent.

The structural arrangement of a dual element ELG which is deposited simultaneously with the deposition of the magnetic heads on the sliders is illustrated in FIGS. 5 through 10. In a lapping guide which is co-deposited, the resistive element is made of the same material and simultaneously with the magnetoresistive transducers and is therefore aligned therewith, and the electrical switch element is made of the same material and simultaneously with the poles of the inductive magnetic transducer and is therefore aligned therewith.

Figure 5:
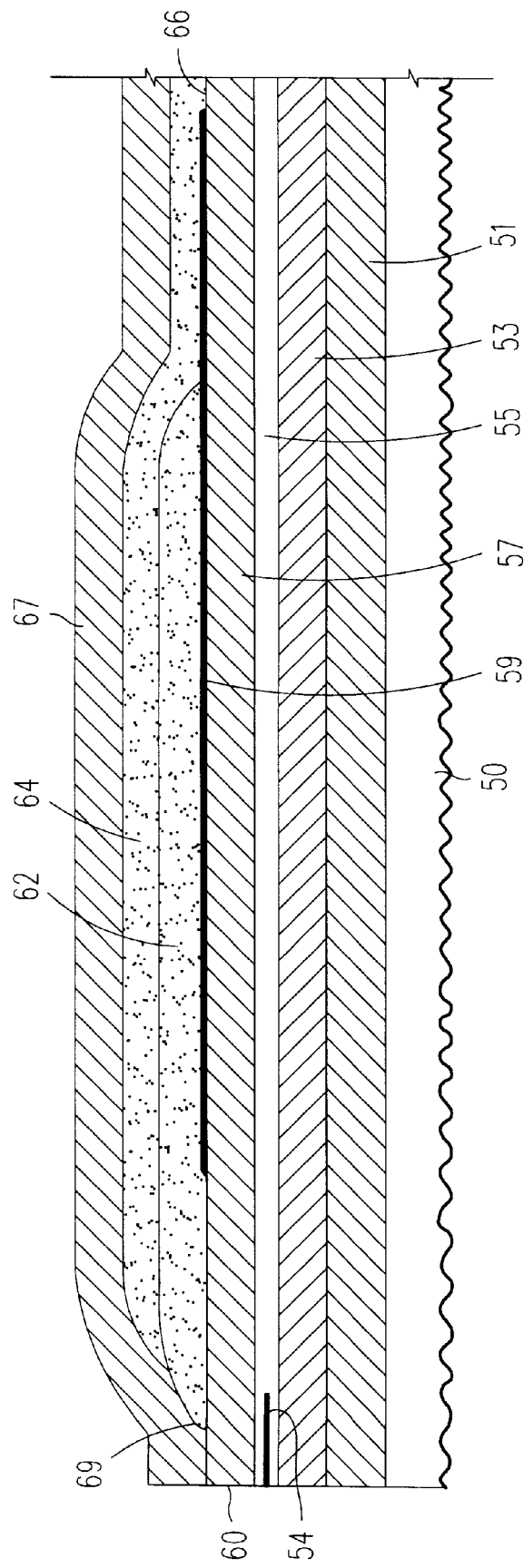
FIG. 5 is a cross sectional view of a dual element lapping guide of one embodiment of the present invention.

Referring first to FIG. 5, a cross section view through the center of the dual element ELG is illustrated. A substrate 50 of ceramic material has an undercoat layer 51 deposited thereon. The next layer 53 is a shield layer, which may comprise "Sendust", a magnetic material well known in the art. The resistive element may include MR stripe 54, which is made from the same material as the MR transducer, and deposited simultaneously therewith and positioned between two MR gap layers shown as layer 55. The conductors for the MR stripe 34 located on either side of the MR stripe 54 are not shown.

The bottom layer 57 of the electrical switch element is made from the same material as the bottom pole pieces of the inductive transducer and is deposited simultaneously therewith, and superposed on the resistive element 54 in the same manner that the bottom pole pieces of the inductive transducers are superposed on the MR transducers of the magnetic heads. The bottom layer of the electrical switch may include a nickel ferrite material.

A write gap layer 59 is deposited on the bottom layer and spaced from the height defining edge 60 of the electrical switching element. In the magnetic head, the write gap layer extends to the height defining edge of the inductive transducer to form the magnetic poles with which to write the magnetic signals. Two insulation layers 62 and 64 are provided, which are on either side of the coils of the magnetic heads, and which insulate the conductors of the electrical lapping guide as will be illustrated. The coil material comprises copper and is also used to provide a center electrical lead 66 electrically connecting the bottom layer 57 of the electrical switch element to a terminal, as also will be discussed. The insulation layers are also spaced from the height defining edge 60 of the electrical switching element.

Lastly, the top layer 67 of the electrical switching element is deposited. The layer 67 comprises the same material as the top pole piece of the inductive transducer of the magnetic head and is deposited simultaneously therewith. The top layer of the electrical switch may thus comprise a nickel ferrite material.

Because the write gap layer 59 and the insulating layers 62 and 64 are spaced from the height defining edge 60, the top layer 67 of the electrical switching element is deposited to be in electrical contact with bottom layer 57 at the height defining edge 60. The point 69 at which the insulation layer 62 separates the top layer 67 from the bottom layer 57 is the point at which the switch is opened when reached by the lapping thereof.

The layers 67 and 57 of the electrical switching element preferably extend the same total distance from the height defining edge 60 as the corresponding magnetic transducer pole pieces extend to the back gap of the magnetic transducer. The distance from the height defining edge thus matches the actual magnetic head, making the process effects such as shrinkage during bake the same.

It is believed that the actual copper coil need not be duplicated in the electrical lapping guide because the bottom insulating layer 62 defines the throat height 69. Thus, the coil structures are not needed to produce same process effects of the coil.

As an alternative, a less noisy, more precise conductive top layer 67 may be provided as a substitute for all or part of the top pole piece material. As an example, gap layer 59 may be extended to the point 69 and a layer of conductive chromium may overlie the gap layer 59, contact the bottom layer 57, and more precisely define the separation point 69.

The composite structure of the electrical lapping guide is illustrated in a series of top views of various sets of layers in FIGS. 6 through 10.

Figure 6:
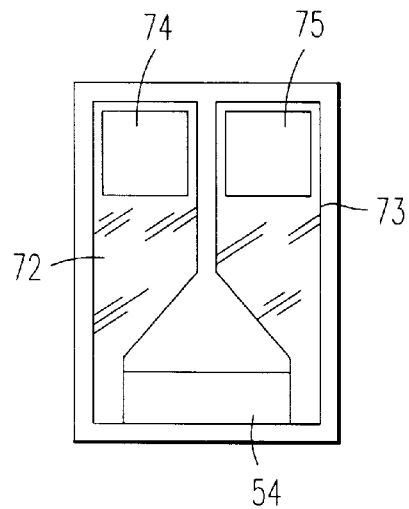
FIGS. 6–9 illustrates top views of layers of the composite structure of the lapping guide of FIG. 5.

Referring to FIG. 6, the structure comprises a shield and first MR gap beneath, a resistance stripe 54 of the MR material, leads 72 and 73 and a second MR gap having etched vias 74 and 75.

Figure 7:
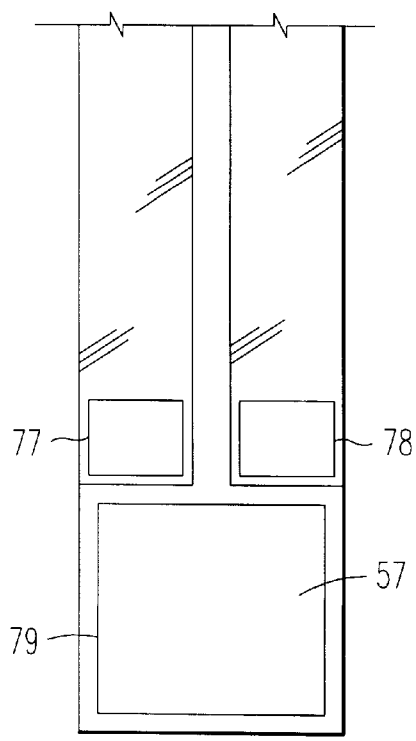

FIG. 7 illustrates a portion of the electrical switching element which is superposed over the resistive element, starting with a bottom pole tip yoke 57, a write gap layer and bottom insulation layer with etched vias 77, 78 and 79. The vias are typically chemically etched. The vias 77 and 78 may extend through the pole piece 57 to the vias 74 and 75, and the insulating layer may extend through the vias to insulate the vias from the pole piece.

Figure 8:
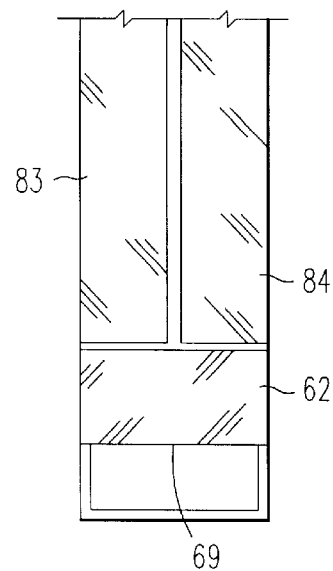

FIG. 8 illustrates the throat height defining insulation layer 62 and the coil layer leads 83 and 84. These layers are typically cross linked photoresist and copper, respectively. The collinearity of the throat layer is assumed by critical process control and the electrical switch junction 69 is assumed to be collinear and printed at a precise offset with respect to the inductive throats, making it substantially parallel to the line of inductive transducer throat heights. The leads 83 and 84 extend through the vias 77 and 78 of FIG. 7 to the vias 74 and 75 for connection to leads 72 and 73 of the resistance element 54 in FIG. 6.

As an alternative, leads 83 and 84 of FIG. 8 may be in the same layers as, and simply providing extensions of leads 72 and 73 of FIG. 6.

Figure 9:
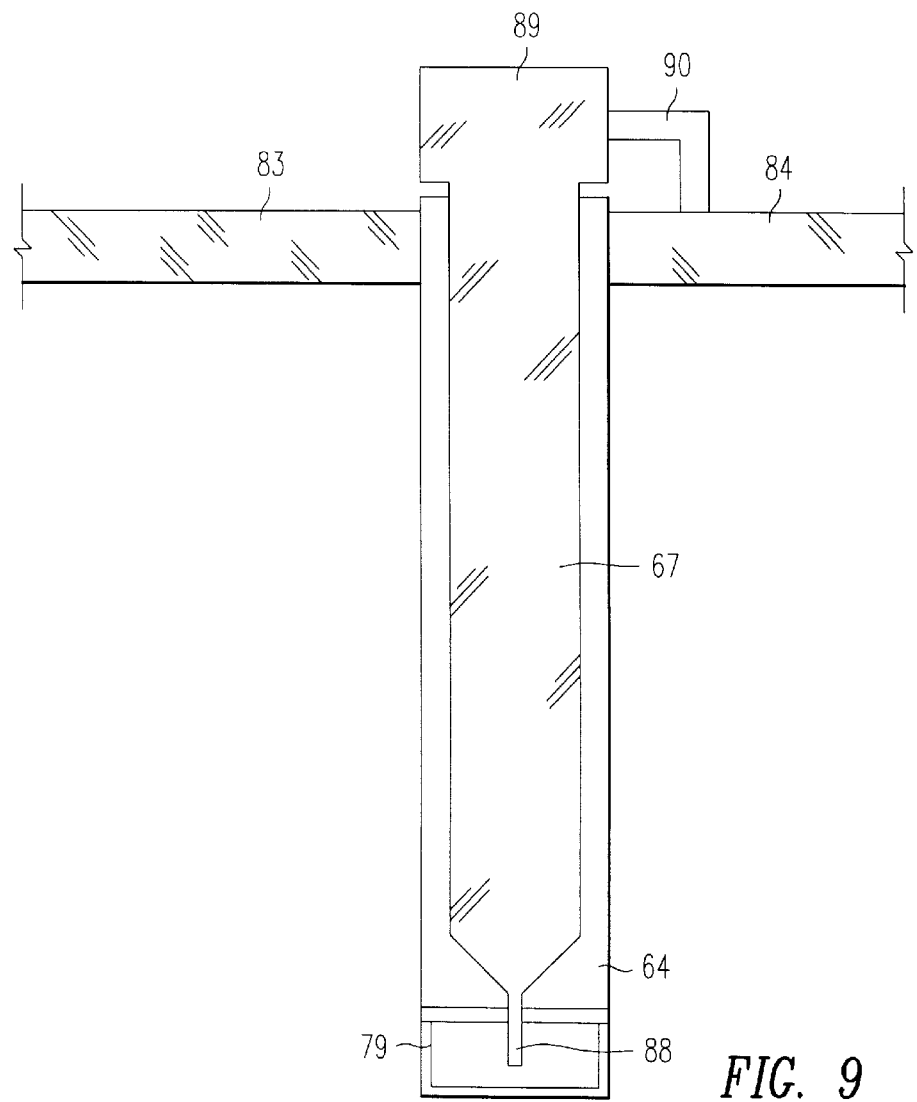

FIG. 9 shows the leads 83 and 84 of FIG. 8 extended to the sides of the ELG. Also shown are the second insulation layer 64 and the top pole tip yoke layer 67 with a pole tip 88 which extends through via 79 to make the electrical contact with the bottom pole tip yoke 57. Top pole tip yoke layer 67 also extends as a third lead area 89 for termination, as will be described.

The alternative chromium layer, discussed above, may similarly extend as third lead 89.

Some electronics systems and algorithms may handle the direct grounding of the bottom pole tip yoke. Line 90 provides the direct connection of lead 66 in FIG. 5 to lead 84, which is grounded, as will be described. Other electronics systems and algorithms function more exactly if the throat height ELG activates a resistance. For this case, line 90 comprises a shunt resistor comprised of MR stripe material, with sufficient cross section and length to provide for a detectable activation final resistance.

Figure 10:
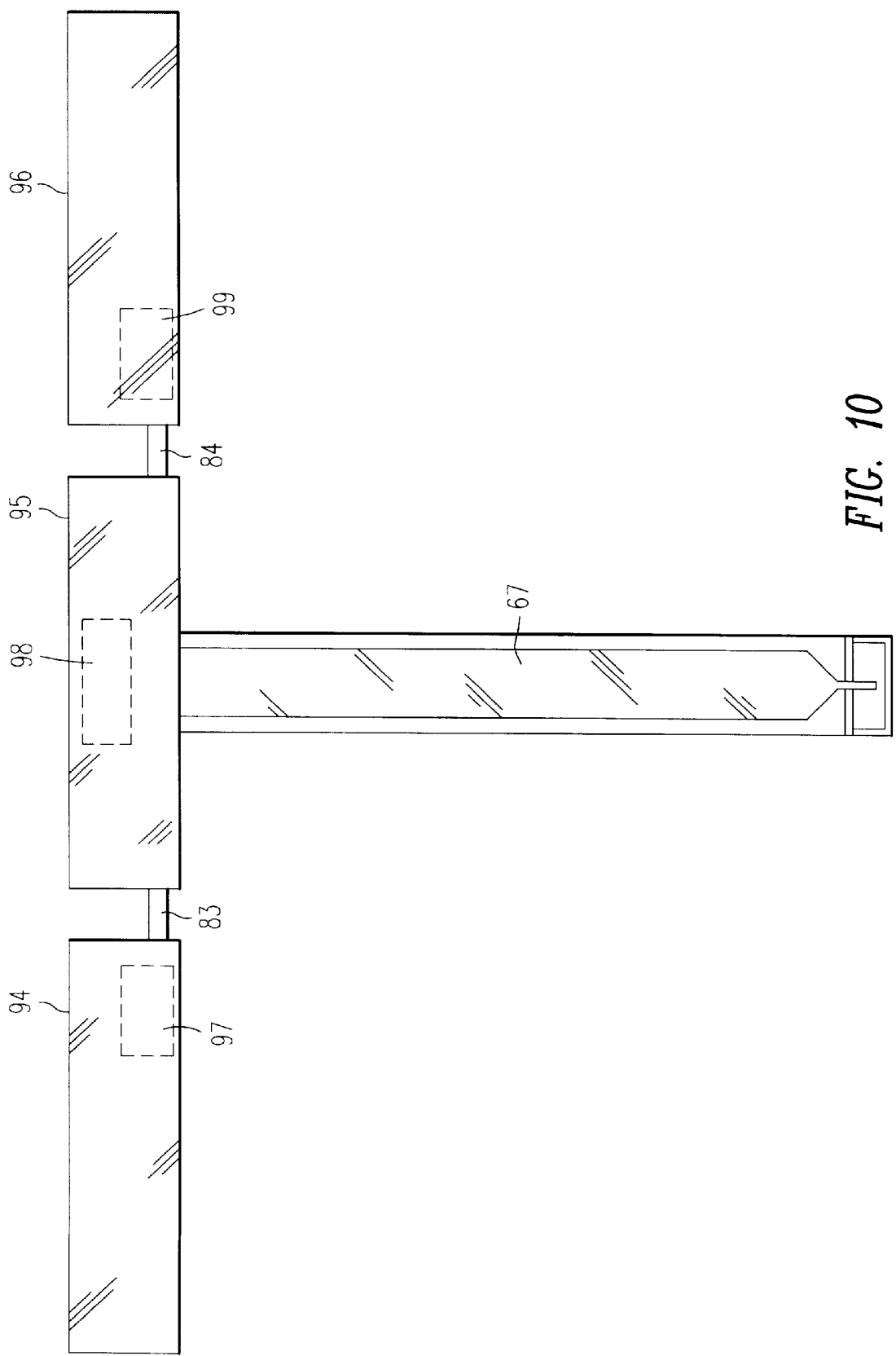
FIG. 10 illustrates a top view of the completed composite structure of the lapping guide of FIG. 5.

Finally, FIG. 10 shows the completed dual element ELG having three termination pads 94, 95 and 96, typically made of plated gold, making electrical contact through an overcoat layer by means of metal studs deposited through vias 97, 98 and 99 typically made of copper. The studs connect each of the gold termination pads to ELG leads 83, 89 and 84 to complete the dual element ELG.

Figure 11:
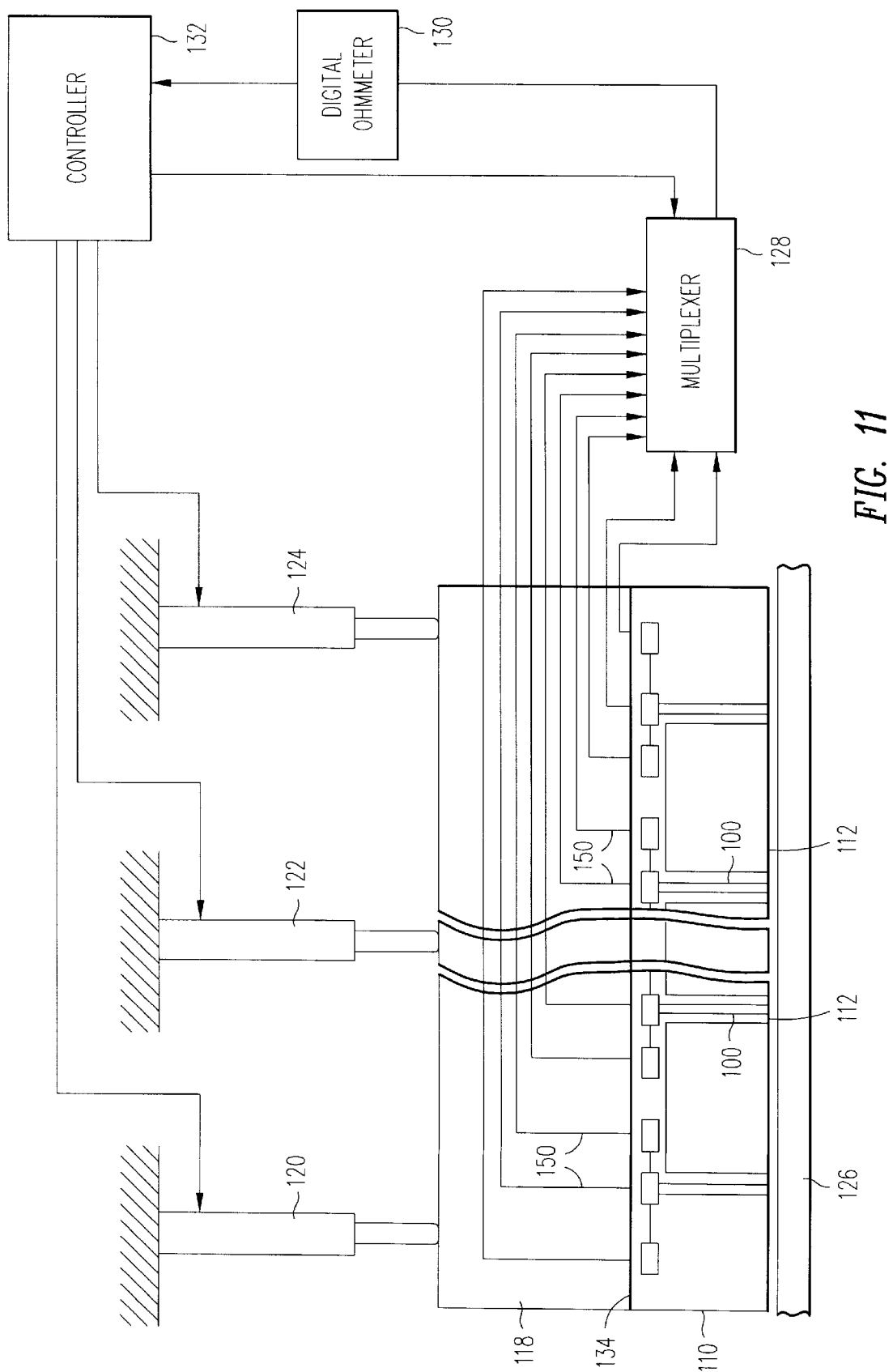
FIG. 11 illustrates a lapping control system for use with the lapping guide of one embodiment of the present invention.

FIG. 11 illustrates the lapping system of the incorporated '868 patent adapted to utilize the lapping guides 100 of the present invention to control the lapping of a substrate row 110 having a plurality of sliders 112. The substrates row is fastened to a holder 118 and placed against three actuators 120, 122 and 124 which position the substrate into a spaced relationship with a lapping plate 126. The actuators 120, 122, and 124 urge the substrate row 110 against the lapping plate 126; and control the amount of pressure placed against the holder 118. The depth of the lapping is monitored by the dual element ELGs 100, which are connected to a multiplexer 128. Mounting the substrate row on the holder 118 which is a flexible beam, permits the beam to deflect along the shape of a particular deflection curve. By measuring the ELGs 100 as described above, it is possible to control the amount of pressure each section of the substrate row receives, and thus permit the actuators 120, 122 and 124 to determine the amount of material removed on the section of the substrate row. By controlling particular actuators, either a convex or a concave bow condition can be corrected by the use of a differential lapping technique. Under the control of a controller 132, each of the resistance measurements provided by the dual elements ELGs 100 are determined from the multiplexer 128 and the meter 130. The results of the measurement are stored in the controller 132 and are utilized as an indication of the transducer heights achieved for the transducer elements as described above. The controller 132 can, by constantly measuring the resistances of the ELGs 100, maintain the substrate row level with respect to the lapping plate so that all the transducer elements are lapped to the same height. When the ELGs 100 indicate that the correct heights have been achieved for all of the transducers, the controller 132 may command the actuators 120, 122 and 124 to withdraw the substrate row 110 from the lapping surface to terminate the lapping process.

While the preferred embodiments of the present invention have been illustrated in detail, it should be apparent that modifications and adaptations to those embodiments may occur to one skilled in the art without departing from the scope of the present invention as set forth in the following claims.

We claim:

1. A dual element electrical lapping guide for a row of multi-layer dual element magnetoresistive and inductive magnetic transducers formed on a substrate, said multi-layer transducers being separated by at least one separation kerf, comprising:
- a resistive element formed on said substrate within one of said separation kerfs, said resistive element having an edge thereof positioned so as to be subject to lapping of said row;
- an electrical switch element superposed on said resistive element within said one separation kerf, said electrical switch element initially closed and subject to lapping of said row to open said switch element; and
- electrical leads coupled to said resistive element and to said electrical switch element, whereby said resistive element and said electrical switch element may be measured to determine the extent of lapping thereof.

2. The dual element electrical lapping guide of claim 1, wherein said magnetoresistive transducers are partially formed of a magnetoresistive material, and said inductive magnetic transducers are partially formed of a conductive material:
- said resistive element is formed of said magnetoresistive material; and
- said electrical switch element is at least partially formed of said inductive magnetic transducer conductive material.

3. A dual element electrical lapping guide for a row of multi-layer dual element magnetoresistive and inductive magnetic transducers formed on a substrate, each magnetoresistive transducer of said multi-layer transducers formed of a magnetoresistive material in at least one layer, each inductive magnetic transducer of said multi-layer transducers having two pole pieces formed of a conductive material in at least two layers, and said multi-layer transducers being separated by at least one separation kerf, comprising:
- a resistive element formed of said magnetoresistive material and in the same layer as said magnetoresistive material of said magnetoresistive transducer, positioned in one of said separation kerfs, said resistive element having an edge thereof positioned so as to be subject to lapping of said row;
- an electrical switch element formed of said inductive magnetic conductive material in the same layers as said conductive material of said inductive magnetic transducer and superposed on said resistive element, positioned in said separation kerf, said electrical switch element initially closed and subject to lapping of said row to open said switch element; and
- electrical leads coupled to said resistive element and to said electrical switch element.

4. The dual element electrical lapping guide of claim 3, wherein said electrical leads comprise three leads, two leads coupled to either side of said resistive element such that said lapping edge extends between said two leads, and a third lead coupled to the bottom one of said layers of said conductive material and coupled to one of said two leads.

5. The dual element electrical lapping guide of claim 4, wherein said inductive magnetic transducers also comprise a coil layer of electrically conductive material, and wherein said two leads of said electrical leads coupled to said resistive element are formed of said coil layer conductive material.

6. The dual element electrical lapping guide of claim 4, further comprising:
- three electrical contact points positioned outside said separation kerf in a row separation area of said substrate opposite said lapping edge, wherein two of said electrical contact points are coupled to two of said electrical leads and a third electrical contact point is coupled to the top one of said layers of said conductive material.

7. The dual element electrical lapping guide of claim 4, wherein said third lead is coupled to said one of said two leads by means of a shunt resistor formed of said magnetoresistive material.

8. A method for depositing a dual element electrical lapping guide system on a substrate for lapping batch fabricated thin film multi-layer dual element magnetoresistive and inductive magnetic transducers on slider sites on said substrate, said slider sites aligned in rows and said slider sites separated by separation kerfs, said multi-layer transducers aligned along one edge of said sliders in said row direction thereof for lapping of said edge, said method comprising the steps of:
- depositing a plurality of resistive elements of resistive material on said substrate, each said resistive element positioned in one of said separation kerfs, each said resistive element having an edge thereof positioned so as to be aligned with said one edge of said multi-layer transducers and subject to lapping of said row;
- depositing a plurality of electrical switch elements of conductive material superposed on said resistive elements, each electrical switch element positioned in one of said separation kerfs, each said electrical switch element initially closed and aligned with said one edge of said multi-layer transducers and subject to lapping of said row to open said switch element; and
- depositing a plurality of sets of electrical leads, each set comprising electrical leads coupled to said resistive element and to said electrical switch element.

* * * * *